United States Patent [19]

Mogi et al.

[11] Patent Number: 4,633,313

[45] Date of Patent: Dec. 30, 1986

[54] METHOD AND APPARATUS FOR TRANSFERRING DATA FOR DIGITALLY CONTROLLING VIDEO EQUIPMENT

[75] Inventors: Takao Mogi; Masayuki Suematsu, both of Tokyo, Japan

[73] Assignee: Sony Corporation, Tokyo, Japan

[21] Appl. No.: 816,831

[22] Filed: Jan. 7, 1986

[30] Foreign Application Priority Data

Jan. 18, 1985 [JP] Japan ................................. 60-6979

[51] Int. Cl.⁴ ............................................. H04N 5/14
[52] U.S. Cl. .................................. 358/160; 358/148; 358/181; 358/903; 358/21 R
[58] Field of Search .............. 358/10, 21 R, 339, 139, 358/148, 160, 181, 903

[56] References Cited

U.S. PATENT DOCUMENTS

| | | | |
|---|---|---|---|
| 4,396,938 | 8/1983 | Dischert | 358/160 |
| 4,488,179 | 12/1984 | Krüger et al. | 358/181 |
| 4,554,582 | 12/1985 | Wine | 358/148 |
| 4,589,020 | 5/1986 | Akatsuka | 358/160 |

Primary Examiner—Michael A. Masinick
Assistant Examiner—Michael D. Parker
Attorney, Agent, or Firm—Lewis H. Eslinger; Alvin Sinderbrand

[57] ABSTRACT

Digital data transfer in a digital television receiver between an internal central processing unit, or an external computer, and the video/audio processing circuitry by way of an internal bus is accomplished efficiently and without producing noise interference by using a high-frequency clock signal and a relatively low-frequency clock signal at different times. The high-frequency signal would normally produce visually perceptable noise, however, it is employed only during vertical blanking intervals, and the low-frequency clock signal, which would not produce visually perceptable noise, is used at all times other than the vertical blanking intervals, whereby noise interference that would be otherwise seen on the visual display of the television receiver is suppressed.

11 Claims, 3 Drawing Figures

METHOD AND APPARATUS FOR TRANSFERRING DATA FOR DIGITALLY CONTROLLING VIDEO EQUIPMENT

BACKGROUND OF THE INVENTION

1. Field of the Invention

This invention relates generally to a method and apparatus for transferring digital data between functional circuit elements in video equipment and, more particularly, for efficiently transferring such digital data in television receivers and video tape recorders in an efficient fashion without producing noise interference.

2. Description of the Background

Video and audio equipment that incorporates internal circuit elements and internal buses that can be digitally controlled are well known. For example, U.S. patent application Serial No. 06/751,982, filed June 28, 1985, and assigned to the assignee of the present invention, describes a control arrangement and method for use with electronic equipment having internal bus elements, in which an external computer is connected to the internal bus. The specific arrangement described in the above-identified patent application relates to a television receiver that employs an internal central processing unit, as well as internal bus lines that connect the audio processing circuitry, the video processing circuitry, the video control circuit, and the deflection control circuit, all of which are digitally controlled by the central processing unit. In conventional operation, the central processing unit also controls a tuning circuit in accordance with instructions that are entered by the user by means of a keyboard on the receiver or a remote control unit. These manually entered instructions relating to the tuning and the like are also typically displayed on a visual display element.

The internal bus is also provided with a connector so that a remotely located computer can be connected to the receiver for testing and/or adjusting both during manufacturing or during repair servicing. Similar instructions can also be entered using a remote control unit that communicates with the receiver using the conventional infrared remote control interface.

When the adjustments are being made to the television set using either the internal central processing unit or the externally connected computer, the command data is transferred over the internal bus in synchronization with internally generated clock pulses. The problem is presented then that as the frequency of the clock pulses is increased noise is generated of such a magnitude that radiation interference disturbances appear on the screen of the television receiver. To avoid these noise disturbances or interferences from being visually presented, one solution is to decrease the clock pulse frequency to reduce the noise. Another approach is to transmit the data only during the vertical blanking interval of the video signal, so that any noise interference that is generated can not be visually displayed. Nevertheless, while solving the noise problem, decreasing the clock frequency also severely reduces the data transmission rate and transferring data only during the vertical blanking intervals reduces the data transfer efficiency and requires a longer period of time in order to transmit all of the necessary command data, thus, slowing down the response characteristics of the television set.

OBJECTS AND SUMMARY OF THE INVENTION

Accordingly, it is an object of the present invention to provide a method and apparatus for transferring digital control data in digital video equipment that can eliminate the above-noted defects inherent in the prior art.

Another object of this invention is to provide a method and apparatus for transferring data for digitally controlling video equipment, in which the data transfer occurs at selected frequencies and at specified times, so as not to cause noise interference on the visual display of the video equipment.

A further object of this invention is to provide a method and apparatus to transfer digital data for digitally controlling video equipment in which data is transferred in a first time period at a first frequency, which is selected to be at a pulse rate that can not cause interference on a visual display, and in which data is transferred at a different, higher frequency during vertical blanking intervals, to thereby also prevent noise interference on the display of the video equipment.

In accordance with an aspect of the present invention, in video equipment data is transferred between central processing circuitry and at least one control circuit utilizing an internal bus by producing a clock pulse signal having a first frequency, which in the normal situation would be of a high frequency that would cause noise disturbances on the video visual display of the video equipment. Another clock pulse signal is produced at a second frequency, which in the normal situation would be so low as not to cause interference on the visual display of the video equipment. Digital data is then transferred between the central processing circuitry and at least one of the digitally controlled circuits in the video equipment via the internal bus using the clock pulses at the first, noise-producing frequency only during the vertical blanking periods, and then utilizing the second, non-noise-producing frequency during all periods of time other than the vertical blanking periods. In this fashion then, no visual noise interference is presented to the user during data transfer.

The above and other objects, features, and advantages of the present invention will become apparent from the following detailed description of illustrative embodiments thereof to be read in conjunction with the accompanying drawings, in which like reference numerals indicate like or similar elements.

DETAILED DESCRIPTION OF PREFERRED EMBODIMENT

Figure 1:
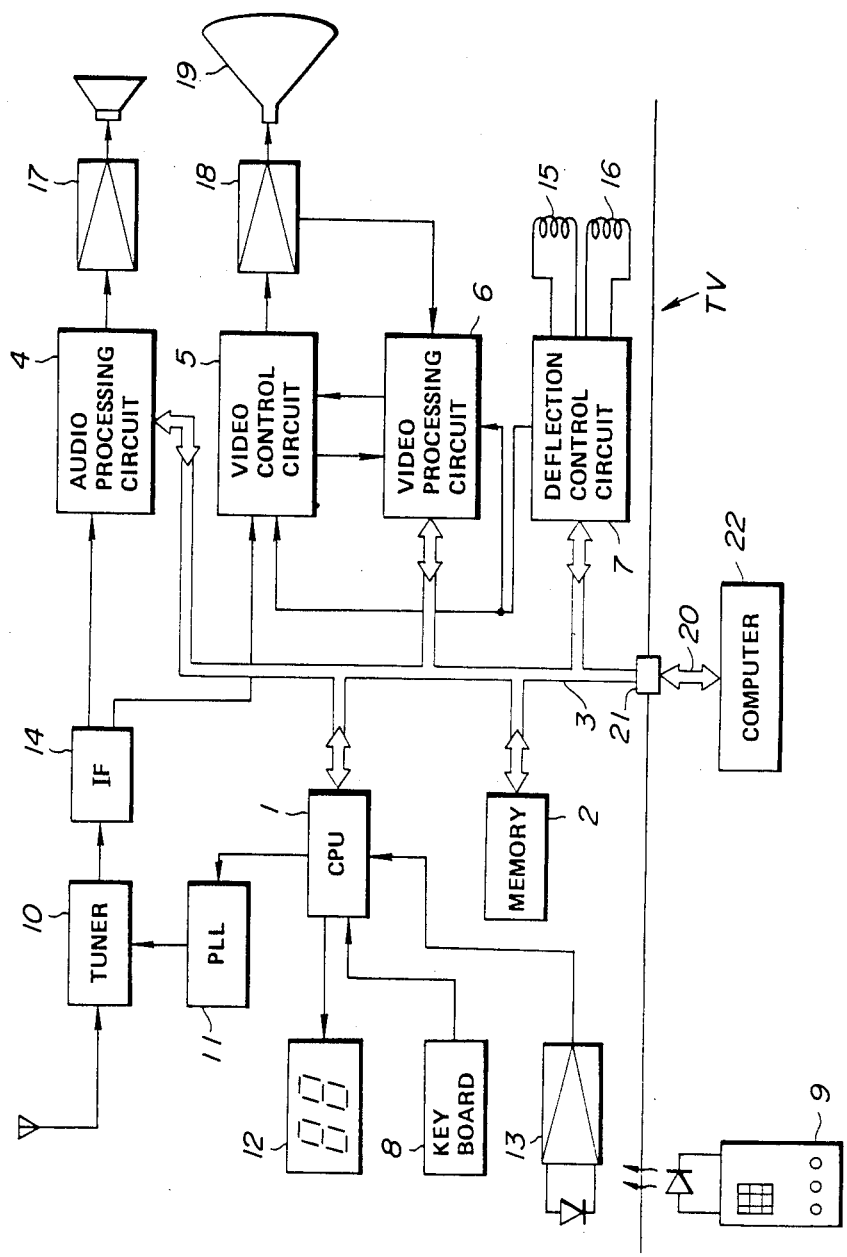
FIG. 1 is a schematic in block diagram form of a digitally controllable television apparatus to which the present invention is applicable.

FIG. 1 shows a typical digitally controlled television receiver that employs an internal bus and a central processing unit, such as disclosed in the above-identified pending patent application. More particularly, the television receiver (TV) includes a central processing unit (CPU) 1 that is in data communication with a memory element 2 by way of an internal data bus 3. As in typical television receivers, an audio processing circuit 4 is provided along with a video control circuit 5, a video processing circuit 6, and a deflection control circuit 7, all of which are digitally controlled. In conventional operation, central processing unit 1 controls a phase lock loop (PLL) circuit 11 that in turn controls a tuner 10 to tune to the selected station. Central processing unit 1 also controls audio processing circuit 4, video control circuit 5, video processing circuit 6, and deflection control circuit 7 in accordance with instructions that are entered by way of a keyboard 8 or by a remote control 9. Consequently, the manually entered values for frequency selection, that is, the selected station, volume adjustments, picture adjustments, and like can be visually displayed on a display unit 12. Other elements found in known digitally controlled television receivers are a remote control receiver 13, an intermediate frequency (IF) amplifier 14, deflection coils 15, 16, an audio output amplifier 17, a video output amplifier 18, and a conventional cathode ray tube (CRT) 19. The manner in which these units cooperate is well known.

An external computer 22 can be connected to internal bus 3 by way of a connector 21, and this computer 22 can then be used to test and adjust the equipment during manufacture or during servicing and repair. Remote control unit 9, as used by the TV viewer, or a similar remote control unit used by the manufacturer or service technician, can be also used to communicate with the central processing unit 1 of the television receiver. Typical of the various items that are to be controlled or adjusted in a television receiver of this kind are, for example, electron beam parameters such as width, linearity, and pin cushion distortion in both horizontal and vertical directions, as well as color adjustments such as white balance, the cut-off points and drive of the red (R), green (G), blue (B) signals, and grid bias adjustments of the cathode ray tube 19.

As indicated hereinabove, it is during adjustment operations of the television receiver by data transfer from the central processing unit 1, or from the externally connected computer 22, to the various audio/video processing and control circuits 4 through 7, that presents the problem, because in order to provide data transfer at a sufficiently high frequency to be data efficient, noise interference is present on the cathode ray tube 19 and also on the visual display 12. Furthermore, simply transferring such digital data only during the vertical blanking intervals provides an inefficient use of available time and makes the television receiver appear to be unresponsive.

Figure 2:
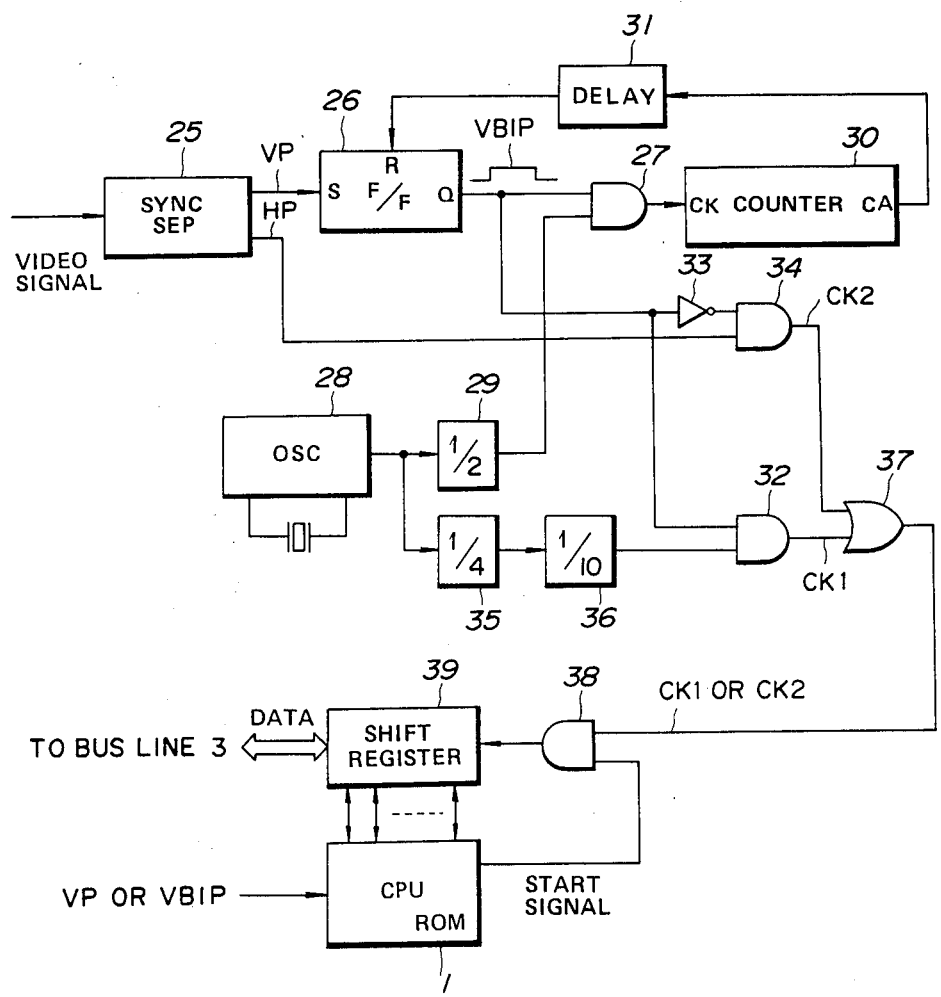
FIG. 2 is a schematic in block diagram form of an embodiment of the present invention.
Figure 3:
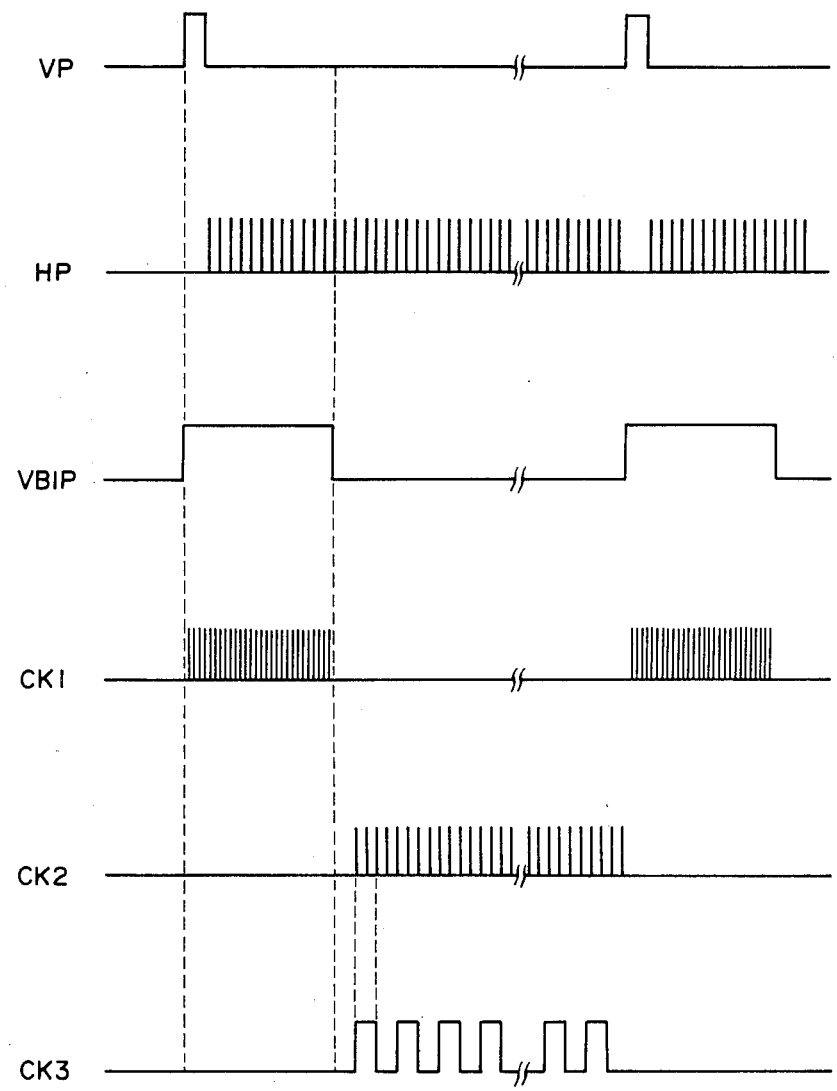
FIG. 3 is a signal timing chart to use for explaining the operation of the embodiment of FIG. 2.

To avoid these problems the present invention provides a system, such as shown in FIG. 2, in which the input video signal is fed to a synchronization signal separator 25 that operates to separate the vertical synchronizing signal VP and the horizontal synchronizing signal HP. The respective, typical waveforms of these signals are shown in FIG. 3. The vertical synchronizing signal VP is fed to an RS flip-flop 26, which operates such that at the rising edge of the vertical synchronizing signal the Q output is raised to a high level. The output of flip-flop 26 is connected to one input of AND gate 27 that receives at its other input a signal originally produced by oscillator 28 after it has been passed through a first divider 29. In this embodiment, oscillator 28 produces a signal having a frequency of 4 MHz and the first divider 29 can be a divide-by-2 divider, so that the signal being fed to the second input of AND gate 27 has a pulse frequency of 2 MHz. Therefore, AND gate 27 operates to pass or gate the 2 MHz pulse signals using the Q output of flip-flop 26, and the gated pulses are then fed to the clock input of counter 30, in which they are counted appropriately. The carry output of counter 30 is fed through a delay circuit 31 to correct the output timing of the carry pulse signal, and the output of delay circuit 31 is then fed to the reset input of flip-flop 26. The result of this is that a vertical blanking interval pulse (VBIP), the waveform of which is shown at VBIP in FIG. 3, is produced at the output Q of flip-flop circuit 26.

The vertical blanking interval pulse (VBIP) signal, as produced at the Q output of flip-flop 26, is fed to one input of AND gate circuit 32 and also to the input of an inverter circuit 33. The inverted vertical blanking interval pulse produced by inverter 33 is then fed to one input of another AND gate 34. The other input to AND gate 32 is derived from oscillator 28 by second and third divider circuits 35 and 36, respectively. More particularly, assuming again in this embodiment that oscillator 28 produces a 4 MHz signal then that signal is divided by four in divider 35 to produce a 1 MHZ signal fed to third divider unit 36, which is a divide-by-10 unit, thereby producing a 100 KHz signal fed to the second input of AND gate 32. Therefore, AND gate 32 operates to pass the 100 KHz pulse signal only during the vertical blanking interval pulses (VBIP), so as to produce the high-frequency clock signal CK1, a typical waveform of which is shown at CK1 in FIG. 3.

On the other hand, AND gate 34 receives at its second input the horizontal sync pulse signal HP, as produced by sync separating circuit 25. AND gate 34, therefore, operates to pass the horizontal sync signal HP only during times other than the vertical blanking interval pulse, as controlled by the output of inverter 33, and thereby produces a low-frequency clock signal CK2, a typical waveform of which is shown at CK2 in FIG. 3. The two clock signals, that is, the high-frequency clock signal CK1 and the relatively low-frequency clock signal CK2 are fed to respective inputs of OR gate circuit 37. OR gate 37 operates to select one or the other of the two inputs, and the output signal of OR gate 37 is fed to one input of AND gate 38.

Although data transmission is accomplished over bus line 3, as represented in FIG. 1, connected to each of the controlled circuit elements 4 through 7, the transferred data being communicated back to central processing unit 1 is best converted from a bit-serial form to bit-parallel form, and vice versa, by means of a shift register 39 that is connected between data bus 3 and central processing unit 1. Shift register 39 is actuated in response to either of the two clock signals, CK1 or CK2, as produced by AND gate 38. The other input of AND gate 38 is a START command signal produced by central processing unit at the commencement of the data transfer.

Accordingly, digital data is then transmitted to or received from any of the audio or video processing and control circuits 4 through 7 in the television receiver of FIG. 1 at a high-speed rate during the vertical blanking interval, and such data is transferred at a low-speed rate, in synchronization with the horizontal sync signal, during all times other than the vertical blanking intervals. In order to provide proper system synchronization, the vertical synchronization pulse or the vertical blanking interval pulse is fed to central processing unit 1 so that the start signal is produced with the correct timing.

Although in the above described embodiment the low-speed clock signal is substantially equal to the horizontal sync pulses as derived from the video signal, a separate low-speed clock signal could be derived from a suitable oscillator or pulse generator that operates in synchronization with the horizontal sync pulses, a typical waveform of which is shown for example as clock signal CK3 in FIG. 3.

Also, although using one clock frequency during the vertical blanking interval and another clock frequency during all times other than the vertical blanking interval permits the data of a plurality of data blocks to be efficiently transmitted, the data of one block is typically not transmitted over two intervals of time. Also, the data to be transmitted using the high speed clock CK1 is generally data that requires a higher response time, such as that used in channel selection control.

Additionally, although the present invention has been described in relation to the television receiver of FIG. 1, the present invention also finds equal utility with a video tape recorder.

The above description is provided for a single preferred embodiment of the invention, however, it will be apparent that many modifications and variations could be effected by one skilled in the art without departing from the spirit or scope of the novel concepts of the invention, which should be determined only by the appended claims.

What is claimed is:

1. A method for transferring data in digitally controlled video equipment of the kind for use in displaying a video signal and having a digital processing unit, at least one digitally controlled circuit, and an internal bus, comprising the steps of:
   producing a first clock pulse signal having a first frequency;
   producing a second clock pulse signal having a second frequency less than said first frequency;
   determining vertical blanking periods of the video signal; and
   transferring data between the digital processing means and said at least one digitally controlled circuit in the video equipment via the internal bus using the first clock pulse signal having the first frequency during the vertical blanking periods and using the second clock pulse signal having the second frequency during all periods of time other than the vertical blanking periods.

2. The method according to claim 1, wherein said step producing a first clock pulse signal includes the steps of:
   providing a first circuit element for generating clock pulses of said first frequency;
   providing a second circuit element for producing a signal indicative of the vertical blanking periods from the input video signal; and
   performing a logical AND operation between the clock pulses having the first frequency generated by said first circuit element and the signal produced by said second circuit element.

3. The method according to claim 2, wherein said step of producing a second clock pulse signal includes the steps of:
   inverting the signal indicative of the vertical blanking periods;
   separating a horizontal synchronization signal from the input video signal; and
   performing a logical AND operation between the horizontal synchronization signal separated from the input video signal and the inverted vertical blanking period signal, whereby the second clock pulse signal having the second frequency is produced.

4. The method according to claim 2, wherein the first clock pulse signal having the first frequency is generated using a reference pulse oscillator producing a reference clock pulse signal having a frequency substantially greater than said first frequency.

5. The method according to claim 4, wherein the first frequency is selected to be 100 KHz.

6. The method according to claim 2, wherein said step of producing a second clock pulse signal includes the steps of:
   inverting the signal indicative of the vertical blanking interval periods;
   separating a horizontal synchronization signal from the input video signal;
   producing the second clock pulse signal in synchronization with the horizontal synchronization signal and having a lower frequency than the horizontal synchronization signal; and
   performing a logical AND operation between the second clock pulse signal and said inverted vertical blanking signal.

7. A system for transferring digital data in digitally controlled video equipment of the kind for use with an input video signal and having a digital processing unit, at least one digitally controlled circuit, and an internal bus, comprising:
   means for producing a first clock pulse signal having a first frequency;
   mean for producing a second clock pulse signal having a second frequency; and
   means for transferring data between the digital processing means and said at least one digitally controlled circuit and the video equipment over the internal bus using said first clock pulse having said first frequency during vertical blanking periods of the input video signal and using said second clock pulse signal having said second frequency during all times other than the vertical blanking periods.

8. The system according to claim 7, wherein said means for producing said second clock pulse signal having the second frequency includes means for deriving said second clock pulse signal from a horizontal synchronizing signal separated from the input video signal.

9. The system according to claim 7, wherein said means for producing said second clock pulse signal having the second frequency includes means for deriving said second clock pulse signal from a signal synchronized with a horizontal synchronizing signal separated from the input video signal.

10. The system according to claim 7, wherein said means for producing said first clock signal comprises a reference clock oscillator for generating a reference clock signal having a predetermined clock frequency and means for dividing down the reference clock to the first frequency.

11. The system according to claim 10, wherein said predetermined clock frequency is 4 MHz and said dividing means comprises a ¼ divider and 1/10 divider.

* * * * *